(12) United States Patent
Nakai et al.

(10) Patent No.: US 8,883,885 B2
(45) Date of Patent: Nov. 11, 2014

(54) POLYAMIDE RESIN COMPOSITION AND METHOD FOR PRODUCING POLYAMIDE RESIN COMPOSITION

(75) Inventors: Miho Nakai, Kyoto (JP); Keisuke Kimura, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 13/637,453

(22) PCT Filed: Apr. 6, 2011

(86) PCT No.: PCT/JP2011/058678
§ 371 (c)(1),
(2), (4) Date: Sep. 26, 2012

(87) PCT Pub. No.: WO2011/126038
PCT Pub. Date: Oct. 13, 2011

(65) Prior Publication Data
US 2013/0030090 A1 Jan. 31, 2013

(30) Foreign Application Priority Data

| Apr. 6, 2010 | (JP) | 2010-088164 |
| Sep. 28, 2010 | (JP) | 2010-217104 |
| Feb. 21, 2011 | (JP) | 2011-034598 |

(51) Int. Cl.
| C08L 97/02 | (2006.01) |
| C08G 79/02 | (2006.01) |
| C08G 18/38 | (2006.01) |
| C08L 77/02 | (2006.01) |
| C08L 77/06 | (2006.01) |
| C08L 77/00 | (2006.01) |
| C08L 1/02 | (2006.01) |
| C08L 1/04 | (2006.01) |

(52) U.S. Cl.
CPC . C08L 77/02 (2013.01); C08L 1/02 (2013.01); C08L 2205/16 (2013.01); C08L 1/04 (2013.01); C08L 77/06 (2013.01); C08L 77/00 (2013.01)
USPC ............................................ 524/35; 524/14

(58) Field of Classification Search
USPC ....................................................... 524/14, 35
See application file for complete search history.

(56) References Cited

U.S. PATENT DOCUMENTS

| 4,365,966 A * | 12/1982 | Bruno et al. ....................... 8/471 |
| 5,723,522 A | 3/1998 | Bergmann |
| 5,874,176 A * | 2/1999 | Kamei et al. ............... 428/474.4 |
| 6,103,790 A * | 8/2000 | Cavaille et al. ................ 524/13 |
| 8,349,948 B2 * | 1/2013 | Hamad et al. ............... 525/54.3 |
| 2002/0086938 A1* | 7/2002 | Scandola et al. ............ 525/54.2 |
| 2009/0043034 A1* | 2/2009 | Ishiduka et al. ............. 524/451 |
| 2009/0234047 A1* | 9/2009 | de Paoli et al. ................ 524/35 |
| 2009/0298976 A1 | 12/2009 | Yano et al. |
| 2010/0059715 A1* | 3/2010 | Tabata et al. ................. 252/500 |
| 2011/0045966 A1* | 2/2011 | Shooshtari et al. .......... 502/159 |
| 2011/0086948 A1* | 4/2011 | Hong et al. ..................... 524/35 |
| 2011/0288194 A1* | 11/2011 | Brule et al. ..................... 522/2 |
| 2012/0177937 A1* | 7/2012 | Ogawa et al. ................ 428/458 |
| 2013/0000512 A1* | 1/2013 | Saiki et al. ................. 106/164.3 |

FOREIGN PATENT DOCUMENTS

| CN | 101291993 | 10/2008 |
| CN | 101528853 | 9/2009 |
| JP | 63-251461 | 10/1988 |
| JP | 9-505329 | 5/1997 |
| JP | 2002-527536 | 8/2002 |
| JP | 2003-171409 | 6/2003 |
| JP | 2006-241450 | 9/2006 |
| JP | 2009-091484 | 4/2009 |
| JP | 2010-77248 | 4/2010 |
| WO | 2006082964 | 8/2006 |
| WO | 2007/034905 | 3/2007 |
| WO | 2008/050568 | 5/2008 |
| WO | 2010/058140 | 5/2010 |

OTHER PUBLICATIONS

Hatakeyama et al. Thermochimica Acta 352-353, 2000, 233-239.*
Zadorecki et al. Polymer Composites, Jul. 1985, 6(3), 162-167.*
International Search Report in PCT/JP2011/058678 dated Jul. 12, 2011.
Office Action dated Feb. 12, 2014 in CN201180014366.9.
English language Abstract of WO2006082964, 2006
English language Abstract of CN101528853, 2009.

* cited by examiner

*Primary Examiner* — Liam J Heincer
(74) *Attorney, Agent, or Firm* — Fildes & Outland, P.C.

(57) ABSTRACT

Disclosed is a polyamide resin composition comprising 0.01 to 50 parts by mass of cellulose fiber having an average fiber diameter of 10 μm or less in relation to 100 parts by mass of a polyamide resin. Also disclosed is a method for producing the polyamide resin composition, wherein the monomer constituting the polyamide resin is subjected to a polymerization reaction in the presence of the cellulose fiber having an average fiber diameter of 10 μm or less in a water-containing state.

10 Claims, 1 Drawing Sheet

F I G. 1
F I G. 2

POLYAMIDE RESIN COMPOSITION AND METHOD FOR PRODUCING POLYAMIDE RESIN COMPOSITION

TECHNICAL FIELD

The present invention relates to a polyamide resin composition improved in mechanical properties and heat resistance and a method for producing the resin composition.

BACKGROUND ART

Resin compositions prepared by reinforcing polyamide resin with inorganic fillers such as glass fiber, carbon fiber, talc and clay are widely known. However, these reinforcing materials improve the mechanical properties and the heat resistance unfortunately only when mixed in large amounts, and the obtained resin compositions are disadvantageously increased in mass because these reinforcing materials are high in specific gravity.

When glass fiber or carbon fiber, for example, is used as the reinforcing material, the molded article made of the obtained resin composition unfortunately undergoes a large warping. Also, in the case where clay or talc, for example, is used as the reinforcing material, when the obtained resin composition is discarded, these reinforcing materials remain as burned residues, and hence unfortunately are buried in soil and semipermanently remain in soil.

Recently, cellulose has been used as reinforcing materials for resin materials. Examples of cellulose include celluloses obtained from wood, celluloses obtained from non-wood resources such as rice straw, cotton, kenaf and hemp, and bacterial celluloses produced by microorganisms; cellulose is found in very large quantities on the earth. Cellulose is excellent in mechanical properties, and accordingly, the inclusion of cellulose in a resin is expected to result in an effect to improve the properties of the resin composition.

As the method for including cellulose in a thermoplastic resin, a method in which the resin and the cellulose are melt-mixed with each other is general. However, in this method, cellulose is mixed in the resin while the aggregated condition of the cellulose is being maintained, and hence a resin composition in which the cellulose is uniformly dispersed cannot be obtained. Consequently, the properties of the resin composition cannot be sufficiently improved.

For example, Patent Literature 1 discloses a composite material including a cellulose pulp fiber in a thermoplastic resin, and also describes a polyamide resin as the thermoplastic resin. In this invention, it is also described that the cellulose pulp fiber is made granular by using, for example, a rotary knife cutter, for the purpose of allowing the cellulose pulp fiber to be easily mixed with the polymer material. However, in Patent Literature 1, it is described that when the cellulose pulp fiber is made granular and the fiber length is made short, the reinforcing capability due to the addition of the cellulose pulp fiber is degraded, and hence the average length of the cellulose pulp fiber is preferably 0.1 to 6 mm.

In the invention of Patent Literature 1, the cellulose pulp fiber is mixed in the thermoplastic resin in a large amount, and in Example of Patent Literature 1, the cellulose pulp fiber is added in a large amount of 30% by mass.

Additionally, in the invention of Patent Literature 1, when the cellulose pulp fiber is mixed with the polymer material, the cellulose pulp fiber is dried and then the melt-mixing of the cellulose pulp fiber and the polymer material is performed.

As can be seen from what has been described above, in the invention of Patent Literature 1, the problem of the aggregation of the cellulose pulp fiber is not yet solved, and additionally, due to the large addition amount of the cellulose pulp fiber, unfortunately coloration ascribable to the decomposition of the cellulose also occurs at a temperature of 230 to 240° C. at the time of injection molding.

Patent Literature 2 describes a thermoplastic resin including 0.01 to 20 parts by weight of cellulose fiber in relation to 100 parts by weight of the resin. In Patent Literature 2, it is also described that the cellulose fiber is a viscose fiber, and the viscose fiber having a fiber length of 50 μm to 5 mm or a fiber diameter of 1 to 500 μm is preferable. In the invention described in Patent Literature 2, the content of the cellulose fiber is smaller than in the invention described in Patent Literature 1, but the fiber length or the fiber diameter of the cellulose fiber is larger, and as a method for including a cellulose fiber, only a melt-mixing method is presented.

Accordingly, also in the invention of Patent Literature 2, such a problem of aggregation of cellulose fiber as described above is not solved.

CITATION LIST

Patent Literature

Patent Literature 1: National Publication of International Patent Application No. 2002-527536
Patent Literature 2: National Publication of International Patent Application No. 1997-505329

SUMMARY OF INVENTION

Technical Problem

The present invention solves the aforementioned problems, and an object of the present invention is to provide a polyamide resin composition including cellulose fiber uniformly dispersed in a polyamide resin without being aggregated and being improved in mechanical properties and heat resistance, and a method for producing the resin composition.

Solution to Problem

The present inventors performed a series of diligent studies for the purpose of solving the aforementioned problems, and consequently have reached the present invention.

Specifically, the gist of the present invention is as follows.

(1) A polyamide resin composition including 0.01 to 50 parts by mass of cellulose fiber having an average fiber diameter of 10 μm or less in relation to 100 parts by mass of a polyamide resin.

(2) The polyamide resin composition according to (1), obtained by performing a polymerization reaction of a monomer constituting the polyamide resin in the presence of the cellulose fiber having the average fiber diameter of 10 μm or less in a water-containing state.

(3) The polyamide resin composition according to (1), wherein a heat deformation temperature thereof under a load of 1.8 MPa is 50° C. or higher.

(4) The polyamide resin composition according to (1), wherein a linear expansion coefficient (derived as an average value in a range from 20 to 150° C.) thereof in an MD direction is $120 \times 10^{-6}$ (1/° C.) or less.

(5) The polyamide resin composition according to (1), wherein the heat deformation temperature thereof under the load of 1.8 MPa is 50° C. or higher, and the linear expansion coefficient (derived as the average value in the range from 20 to 150° C.) thereof in the MD direction is $120 \times 10^{-6}$ (1/° C.) or less.

(6) The polyamide resin composition according to (1), wherein the heat deformation temperature thereof under the load of 1.8 MPa is 65° C. or higher.

(7) The polyamide resin composition according to (1), wherein the linear expansion coefficient (derived as the average value in the range from 20 to 150° C.) thereof in the MD direction is $80 \times 10^{-6}$ (1/° C.) or less.

(8) The polyamide resin composition according to (1), wherein the heat deformation temperature thereof under the load of 1.8 MPa is 65° C. or higher, and the linear expansion coefficient (derived as the average value in the range from 20 to 150° C.) thereof in the MD direction is $80 \times 10^{-6}$ (1/° C.) or less.

(9) The polyamide resin composition according to any one of (1) to (5), wherein the polyamide resin is nylon 11 or nylon 12.

(10) The polyamide resin composition according to any one of (1), (2) and (6) to (8), wherein the polyamide resin is nylon 6 or nylon 66.

(11) A method for producing the polyamide resin composition according to any one of (1) to (10), wherein a monomer constituting the polyamide resin is subjected to a polymerization reaction in the presence of the cellulose fiber having the average fiber diameter of 10 μm or less in a water-containing state.

Advantageous Effects of Invention

The polyamide resin composition of the present invention includes cellulose fiber having an average fiber diameter of 10 μm or less, and the cellulose fiber is uniformly dispersed in the resin composition without being aggregated, and hence the polyamide resin composition is improved in mechanical properties such as strength and linear expansion coefficient. Consequently, the polyamide resin composition of the present invention enables various molded articles to be obtained by molding methods such as injection molding, extrusion molding and foam molding, and thus can be used in various applications.

According to the method for producing a polyamide resin composition of the present invention, the cellulose fiber is not included in the polyamide resin in an aggregated condition, and hence it is possible to obtain the polyamide resin composition of the present invention in which the cellulose fiber is uniformly dispersed. Therefore, it is possible to improve the mechanical properties and the heat resistance of the polyamide resin composition even when the content of the cellulose fiber is relatively small.

BRIEF DESCRIPTION OF DRAWINGS

FIG. 1 is an electron microgram of a cross-section of a resin composition obtained in Example 9.
FIG. 2 is an electron microgram of a cross-section of a resin composition obtained in Comparative Example 10.

DESCRIPTION OF EMBODIMENTS

Hereinafter, the present invention is described in detail.
The polyamide resin used in the present invention refers to a polymer having an amide bond formed from an amino acid, a lactam or a diamine and a dicarboxylic acid.

Examples of the monomers forming such polyamide resins include: amino acids such as 6-aminocaproic acid, 11-aminoundecanoic acid, 12-aminododecanoic acid and paraaminomethyl benzoic acid.

Examples of the lactam forming such polyamide resins include: ε-caprolactam and ω-laurolactam.

Examples of the diamine forming such polyamide resins include: tetramethylenediamine, hexametylenediamine, nonamethylenediamine, decamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis(aminopropyl)piperazine and aminoethylpiperazine.

Examples of the dicarboxylic acid forming such polyamide resins include: adipic acid, suberic acid, azelaic acid, sebacic acid, dodecanedioic acid, terephthalic acid, isophthalic acid, naphthalenedicarboxylic acid, 2-chloroterephthalic acid, 2-methylterephthalic acid, 5-methylisophthalic acid, 5-sodiumsulfoisophthalic acid, hexahydroterephthalic acid, hexahydroisophthalic acid and diglycolic acid.

More specifically, examples of the polyamide resin used in the present invention include: polycaproamide (nylon 6), polytetramethyleneadipamide (nylon 46), polyhexamethyleneadipamide (nylon 66), polyhexamethylenesebacamide (nylon 610), polyhexamethylenedodecamide (nylon 612), polyundecamethyleneadipamide (nylon 116), polyundecaneamide (nylon 11), polydodecaneamide (nylon 12), polytrimethylhexamethylene terephtalamide (nylon TMHT), polyhexamethylene terephthalamide (nylon 6T), polyhexamethylene isophthalamide (nylon 6I), polyhexamethylene terephthal/isophthalamide (nylon 6T/6I), polybis(4-aminocyclohexyl)methane dodecamide (nylon PACM 12), polybis(3-methyl-4-aminocyclohexyl)methane dodecamide (nylon dimethyl PACM 12), polymetaxylyleneadipamide (nylon MXD6), polynonamethyleneterephthalamide (nylon 9T), polydecamethyleneterephthalamide (nylon 10T), polyundecamethyleneterephthalamide (nylon 11T) and polyundecamethylenehexahydroterephthalamide (nylon 11T(H)); the polyamide resin used in the present invention may also be copolymers of these or mixtures of these. Among these, particularly preferable polyamide resins are nylon 6, nylon 66, nylon 11 and nylon 12, and copolymers of these and mixtures of these.

The polyamide resin composition of the present invention includes such a polyamide resin as aforementioned and cellulose fiber. Examples of the cellulose fiber used in the present invention include cellulose derived from wood, rice straw, cotton, hemp and kenaf, and additionally biological cellulose such as bacterial cellulose, valonia cellulose and sea-squirt cellulose. Examples of the cellulose fiber used in the present invention also include regenerated cellulose and cellulose derivatives.

The polyamide resin composition of the present invention becomes a polyamide resin composition improved in mechanical properties such as strength and linear expansion coefficient and heat resistance through inclusion of cellulose fiber. For the purpose of sufficiently improving the mechanical properties and the heat resistance of the resin composition, it is necessary to disperse cellulose fiber uniformly in the resin without aggregating cellulose fiber. For that purpose, the dispersibility of the cellulose fiber in the polyamide resin and the affinity between the polyamide resin and the cellulose fiber are important. Also for the purpose of allowing the properties of the hydroxyl group possessed by the cellulose fiber to be exhibited as much as possible, it is important to increase the surface area of the cellulose fiber. For that purpose, it is necessary to use such cellulose fiber that is made as fine as possible.

Accordingly, in the present invention, it is necessary to use cellulose fiber having an average fiber diameter of 10 μm or less, and in particular, the average fiber diameter is preferably 500 nm or less, more preferably 300 nm or less and furthermore preferably 100 nm or less. The cellulose fiber having an average fiber diameter exceeding 10 μm cannot increase the surface of the cellulose fiber, and finds difficulty in improving the dispersibility in and the affinity to the polyamide resin or the monomers forming the polyamide resin. The lower limit of the average fiber diameter is not particularly limited; however, in consideration of the productivity of the cellulose fiber, the average fiber diameter is preferably 4 nm or more.

As such cellulose fiber having an average fiber diameter of 10 μm or less (hereinafter, referred to as the cellulose fiber (A), as the case may be), microfibrillated cellulose fiber prepared by splitting cellulose fiber is preferable. For a technique for microfibrillation, various crushing apparatuses such as a ball mill, a stone mill crusher, a high-pressure homogenizer and a mixer can be used. As the cellulose fiber (A), a commercially available product, for example, "Celish" manufactured by Daicel FineChem Ltd. can be used.

Alternatively, as the cellulose fiber (A), cellulose fiber aggregates sorted as waste threads in the production steps of fiber products using cellulose fiber can also be used. Examples of the production steps of fiber products include steps of spinning, weaving, producing non-woven fabric and processing of fiber products. The cellulose fiber aggregates in these steps are obtained as waste threads after the cellulose fiber passes these steps, and hence are formed of cellulose fibers made fine.

As the cellulose fiber (A), bacterial cellulose produced by bacteria can also be used; for example, a bacterial cellulose produced by acetic acid bacteria of the genus *Acetobacter* as producing bacteria can also be used. Plant cellulose is formed through bundling of cellulose molecular chains, and is formed through bundling of very fine microfibrils; however, the cellulose produced by the acetic acid bacteria is of a ribbon shape of 20 to 50 nm in width, and forms an extremely fine network as compared with plant cellulose.

Further alternatively, as the cellulose fiber (A), cellulose fibers made fine may also be used which are obtained by oxidizing cellulose fibers in the presence of an N-oxyl compound, then washing with water and subjecting to a physical defibration step.

As the N-oxyl compound, various compounds are available; however, for example, 2,2,6,6-tetramethylpiperidine-1-oxyl radical (hereinafter, described as TEMPO) shown in Cellulose (1998), 5, 153-164 is preferable. Such a compound is added to a reaction aqueous solution within the range of a catalytic quantity.

To the aqueous solution, sodium hypochlorite or sodium chlorite is added as a co-oxidant, and an alkali metal bromide is added, and thus the reaction is allowed to proceed. The pH of the reaction solution is maintained at around 10 by adding an alkaline compound such as an aqueous solution of sodium hydroxide, and the reaction is continued until the change of the pH is not found. The reaction temperature may be set at room temperature. After the completion of the reaction, the N-oxyl compound remaining in the reaction system is preferably removed. For cleaning, various methods such as filtration and centrifugal separation can be adopted.

Subsequently, by using such various crushing apparatus as aforementioned, the reaction product is subjected to the physical defibration step, and thus the cellulose fiber (A) that is made fine can be obtained.

In the present invention, the measurement method of the average fiber diameter of the cellulose fiber included in the resin composition is as follows. By using a freeze ultramicrotome, from the resin composition (or a molded article made of the resin composition), a 100-nm thick section is sampled and dyed with $OsO_4$ (osmium tetraoxide), and then the section is observed with a transmission electron microscope (JEM-1230, manufactured by JEOL Ltd.). From the electron microscopic image, the length of the cellulose fiber (monofilament) in the direction perpendicular to the lengthwise direction of the cellulose fiber (monofilament) is measured. In this case, the maximum length in the perpendicular direction is taken as the fiber diameter. In the same manner, the fiber diameter of ten cellulose fibers (monofilaments) are measured, and the average value derived from the obtained 10 fiber diameters is taken as the average fiber diameter.

In the case where the fiber diameter of the cellulose fiber is large, a 10-μm thick section cut out with a microtome or the resin composition (or an molded article made of the resin composition) is observed as it is with a stereomicroscope (SZ-40, manufactured by Olympus Corp.), the fiber diameter is measured from the obtained image in the same manner as aforementioned, and the average fiber diameter is determined.

The length of the cellulose fiber included in the resin composition in the present invention can be determined when the average fiber diameter is measured as aforementioned, and means the length in the lengthwise direction of the cellulose fiber (monofilament) in the electron microscopic image. Similarly to the case of the fiber diameter, the lengths of 10 cellulose fibers (monofilaments) are measured, and the average value of the lengths over the 10 cellulose fibers is derived and taken as the average fiber length.

In the cellulose fiber in the present invention, the aspect ratio (average fiber length/average fiber diameter), which is the ratio between the aforementioned average fiber diameter and the aforementioned average fiber length, is preferably 10 or more, and in particular, preferably 50 or more and more preferably 100 or more. The aspect ratio of 10 or more allows the polyamide resin composition to be easily improved in the mechanical properties thereof, to be higher in the strength thereof and to be lower in the linear expansion coefficient thereof.

By preparing the polyamide resin composition of the present invention by the below-described production method of the present invention, the cellulose fiber (A) can be uniformly dispersed in the resin even when the aspect ratio of the cellulose fiber (A) is 100 or more.

The content of the cellulose fiber (A) in the polyamide resin composition of the present invention is required to be 0.01 to 50 parts by mass, and in particular, is preferably 0.05 to 30 parts by mass, more preferably 0.1 to 20 parts by mass and furthermore preferably 0.1 to 10 parts by mass, in relation to 100 parts by mass of the polyamide resin. When the content of the cellulose fiber (A) is less than 0.01 part by mass in relation to 100 parts by mass of the polyamide resin, such effects due to the inclusion of the cellulose fiber (A) as aforementioned, namely, the improvements effects of the mechanical properties and the heat resistance cannot be achieved. On the other hand, when the content of the cellulose fiber (A) exceeds 50 parts by mass in relation to 100 parts by mass of the polyamide resin, sometimes it is difficult to include the cellulose fiber (A) in the resin composition, or sometimes the discoloration of the resin composition occurs at the time of the molding such as injection molding of the obtained resin composition when the resin composition is heat treated at a high temperature.

By preparing the polyamide resin composition of the present invention by the below-described production method of the present invention, even when the content of the cellulose fiber (A) is small, the cellulose fiber (A) is uniformly dispersed in the polyamide resin and hence the polyamide resin composition undergoes sufficient improvement effects of the mechanical properties and the heat resistance. Specifically, even when the content of the cellulose fiber (A) falls within the range from 0.01 to 10 parts by mass in relation to 100 parts by mass of the polyamide resin, the polyamide resin composition is high in strength, low in linear expansion coefficient and excellent in mechanical properties, and at the same time, excellent in heat resistance.

In such a polyamide resin composition as aforementioned of the present invention, including polyamide resin and the cellulose fiber (A), the number average molecular weight thereof is preferably 10,000 to 100,000. The number average molecular weight of less than 10,000 unpreferably results in low mechanical properties. On the other hand, the number average molecular weight exceeding 100,000 unpreferably leads to a steep degradation of the moldability of the resin composition. The number average molecular weight as referred to herein means a value determined relative to PMMA standards at 40° C. with a gel permeation chromatography (GPC) apparatus equipped with a differential refractive index detector, by using hexafluoroisopropanol as an eluent.

The cellulose fiber has a very high affinity to water, and the smaller the average fiber diameter is, the more satisfactory dispersion condition the cellulose fiber can maintain. When the cellulose fiber loses water, the cellulose fibers strongly aggregate with each other through hydrogen bonds, and once such an aggregation is achieved, it becomes difficult for the cellulose fibers to take the same dispersion condition as before aggregation. In particular, the smaller the average fiber diameter of the cellulose fiber is, the more remarkable this tendency is.

Accordingly, it is preferable that the cellulose fiber form a composite material with the polyamide resin under the condition that the cellulose fiber contains water.

Thus, it is preferable to adopt, as the method for producing the polyamide resin composition of the present invention, a method in which when the polyamide resin is obtained by a polymerization reaction, the monomer constituting the polyamide resin and an aqueous dispersion of the cellulose fiber (A) are mixed, and the resulting mixture is subjected to the polymerization reaction. In other words, the production method of the present invention is a method in which the resin composition including the cellulose fiber (A) is obtained by performing the polymerization reaction in the presence of the cellulose fiber in a water-containing state, at the time of polymerization of the polyamide resin.

According to such a production method of the present invention, it is made possible to obtain a polyamide resin composition in which the cellulose fiber (A) is uniformly dispersed without being aggregated, and in particular, it is possible to allow the polyamide resin composition to be a resin composition improved in mechanical properties and heat resistance.

The polyamide resin composition of the present invention is excellent in heat resistance. As an index indicating the heat resistance, the heat deformation temperature is available. In the polyamide resin composition of the present invention, the heat deformation temperature under a load of 1.8 MPa is preferably 50° C. or higher, and in particular, more preferably 60° C. or higher and furthermore preferably 70° C. or higher. When the heat deformation temperature under a load of 1.8 MPa is lower than 50° C., the polyamide resin composition has no sufficient heat resistance, and accordingly it becomes difficult to use the polyamide resin composition in various applications.

When nylon 6 or nylon 66 is used as the polyamide resin, the heat deformation temperature under a load of 1.8 MPa is preferably 65° C. or higher, and in particular, preferably 70° C. or higher and more preferably 80° C. or higher. When nylon 11 or nylon 12 is used, the heat deformation temperature under a load of 1.8 MPa is preferably 50° C. or higher, and in particular, preferably 55° C. or higher.

In the polyamide resin composition of the present invention, the heat deformation temperature under a load of 0.45 MPa is preferably 148° C. or higher, and in particular, preferably 155° C. or higher and more preferably 180° C. or higher. When the heat deformation temperature under a load of 0.45 MPa is lower than 148° C., the polyamide resin composition has no sufficient heat resistance, and accordingly it becomes difficult to use the polyamide resin composition in various applications.

When nylon 6 or nylon 66 is used as the polyamide resin, the heat deformation temperature under a load of 0.45 MPa is preferably 180° C. or higher, and in particular, preferably 190° C. or higher. When nylon 11 or nylon 12 is used, the heat deformation temperature under a load of 0.45 MPa is preferably 148° C. or higher, and in particular, preferably 150° C. or higher.

The heat deformation temperature in the present invention is the value determined by using the same specimen as prepared when the below described measurements of the flexural strength and the flexural modulus of elasticity are performed and on the basis of ASTM D648. In this case, the measurement is performed with the loads of 1.8 MPa and 0.45 MPa.

The polyamide resin composition of the present invention is also excellent in mechanical properties. As the indexes indicating the mechanical properties, the linear expansion coefficient and the strength are available.

In the polyamide resin composition of the present invention, the linear expansion coefficient in the MD direction is preferably $120 \times 10^{-6}$ ($1/°$ C.) or less, and in particular, preferably $100 \times 10^{-6}$ ($1/°$ C.) or less and more preferably $80 \times 10^{-6}$ ($1/°$ C.). When the linear expansion coefficient in the MD direction exceeds $120 \times 10^{-6}$ ($1/°$ C.), the polyamide resin composition tends to be poor in dimensional stability, and accordingly, it becomes difficult to use the polyamide resin composition in various applications.

When nylon 6 or nylon 66 is used as the polyamide resin, the linear expansion coefficient in the MD direction is preferably $80 \times 10^{-6}$ ($1/°$ C.) or less, and in particular, preferably $70 \times 10^{-6}$ ($1/°$ C.) or less and more preferably $50 \times 10^{-6}$ ($1/°$ C.) or less. When nylon 11 or nylon 12 is used as the polyamide resin, the linear expansion coefficient in the MD direction is preferably $120 \times 10^{-6}$ ($1/°$ C.) or less, and in particular, preferably $110 \times 10^{-6}$ ($1/°$ C.) or less.

The linear expansion coefficient in the present invention is the value determined by using the same specimen as prepared when the below described measurements of the flexural strength and the flexural modulus of elasticity are performed and on the basis of JIS K 7197, and the average value in the range from 20 to 150° C. is derived. The flow direction of the resin at the time of molding is defined as the MD direction and the direction perpendicular to the flow direction is defined as the TD direction.

In the polyamide resin composition of the present invention, the flexural strength is preferably 65 MPa or more, and in particular, preferably 70 MPa or more and more preferably 100 MPa or more. In the polyamide resin composition of the present invention, the tensile yield strength is preferably 40 MPa or more, and in particular, preferably 45 MPa or more and more preferably 70 MPa or more.

When the flexural strength is less than 65 MPa or the tensile yield strength is less than 40 MPa, the polyamide resin composition has no sufficient strength, and it becomes difficult to use the polyamide resin composition in various applications.

In the polyamide resin composition of the present invention, when nylon 6 or nylon 66 is used as the polyamide resin, the flexural strength is preferably 120 MPa or more, and in particular, preferably 130 MPa or more and more preferably 140 MPa or more. The tensile yield strength is preferably 70 MPa or more, and in particular, preferably 75 MPa or more and more preferably 80 MPa or more.

When nylon 11 or nylon 12 is used as the polyamide resin, the flexural strength is preferably 65 MPa or more, and in particular, preferably 70 MPa or more. The tensile yield strength is preferably 40 MPa or more, and in particular, preferably 45 MPa or more.

Moreover, in the polyamide resin composition of the present invention, the flexural modulus of elasticity is preferably 1.8 GPa or more, and in particular, preferably 2.5 GPa or more and more preferably 3.0 GPa or more. The tensile modulus of elasticity is preferably 1.4 GPa or more, and in particular, preferably 2.0 GPa or more and more preferably 2.2 GPa or more.

When the flexural modulus of elasticity is less than 1.8 GPa or the tensile modulus of elasticity is less than 1.4 GPa, the polyamide resin composition is poor in flexibility and too strong in rigidity, and even when the flexural strength or the tensile yield strength falls within the aforementioned range, the polyamide resin composition is poor in versatility and practically unsatisfactory.

In the polyamide resin composition of the present invention, when nylon 6 or nylon 66 is used as the polyamide resin, the flexural modulus of elasticity is preferably 2.5 GPa or more, and in particular, preferably 3.0 GPa or more and more preferably 3.3 GPa or more. The tensile modulus of elasticity is preferably 2.0 GPa or more, and in particular, preferably 2.2 GPa or more and more preferably 2.4 GPa or more.

When nylon 11 or nylon 12 is used as the polyamide resin, the flexural modulus of elasticity is preferably 1.8 GPa or more, and in particular, preferably 2.0 GPa or more. The tensile modulus of elasticity is preferably 1.4 GPa or more and more preferably 1.5 GPa or more.

In the present invention, the measurements of the flexural strength, the tensile yield strength, the flexural modulus of elasticity and the tensile modulus of elasticity are performed by using the specimens obtained under the following injection molding conditions, on the basis of ASTM D790 at 23° C.

(Injection Molding Conditions)

The polyamide resin composition is subjected to a molding by using an injection molding machine (Model IS-80G, manufactured by Toshiba Machine Co., Ltd.) and by using a mold for a ⅛-inch 3-point bending test specimen based on the ASTM standard, to yield a specimen of length×width×thickness=127 mm (5 inches)×12.7 mm (½)×3.2 mm (⅛ inch).

Next, the method for producing a polyamide resin composition of the present invention is described.

The method for producing a polyamide resin composition of the present invention is a method in which the monomer constituting the polyamide resin is subjected to a polymerization reaction in the presence of the cellulose fiber having the average fiber diameter of 10 μm or less in a water-containing state, for example, the monomer constituting the polyamide resin and cellulose fiber having an average fiber diameter of 10 μm or less are mixed, and the resulting mixture is subject to a polymerization reaction. The aqueous dispersion of the cellulose fiber in the production method of the present invention is an aqueous dispersion prepared by dispersing such cellulose fiber having an average fiber diameter of 10 μm or less, and the content of the cellulose fiber in the aqueous dispersion is preferably set to be 0.01 to 50% by mass. Such an aqueous dispersion can be obtained by stirring purified water and the cellulose fiber with a mixer or the like.

Then, the aqueous dispersion of the cellulose fiber and the monomer constituting the polyamide resin are mixed, and the resulting mixture is stirred with a mixer or the like to yield a uniform dispersion. Subsequently, the dispersion is heated to be increased in temperature to 150 to 270° C. and stirred to allow the polymerization reaction to proceed. In this case, by gradually discharging the water vapor when the dispersion is heated, the water content of the aqueous dispersion of the cellulose fiber can be discharged. At the time of the aforementioned polymerization of polyamide, if necessary, a catalyst such as phosphoric acid or phosphorous acid may also be added. And, after the completion of the polymerization reaction, the obtained resin composition is taken out, and then preferably cut into pellets.

When a bacterial cellulose is used as the cellulose fiber, as the aqueous dispersion of the cellulose fiber, an aqueous dispersion obtained by immersing the bacterial cellulose into purified water and by performing solvent substitution may also be used. When an aqueous dispersion of the bacterial cellulose prepared by solvent substitution, preferably, after the solvent substitution, the concentration is regulated to a predetermined concentration, then the dispersion and the monomer constituting the polyamide resin are mixed, and then in the same manner as aforementioned, the polymerization reaction is allowed to proceed.

As described above, the production method of the present invention uses a cellulose fiber having an average fiber diameter of 10 μm or less, the cellulose fiber is used as it is in a form of an aqueous dispersion for the polymerization reaction, and thus the cellulose fiber is used as it is in a satisfactory dispersion condition. Moreover, the cellulose fiber used for the polymerization reaction is improved in dispersibility, through the interaction with the monomer being involved in the polymerization reaction and water, and also due to the stirring under such temperature condition as aforementioned; thus, no mutual aggregation of the cellulose fibers occurs, and it is possible to obtain a resin composition in which the cellulose fiber having a small average fiber diameter is dispersed in a satisfactory manner. In this way, according to the production method of the present invention, the dispersibility of the cellulose fiber is improved, and accordingly, in some cases, the cellulose fiber included in the resin composition after the completion of the polymerization reaction is smaller in average fiber diameter and/or in average fiber length than the cellulose fiber added before the polymerization reaction.

Also, in the production method of the present invention, the step of drying the cellulose fiber becomes unnecessary, and thus, the production can be made without passing through such a step that causes scattering of fine cellulose fibers, and it is possible to obtain the polyamide resin composition with a satisfactory operability. The production method of the present invention needs no substitution of water with an organic solvent for the purpose of achieving uniform dispersion of the monomer and the cellulose, and hence is excellent in handling and enables the discharge of chemical substances during the production step to be suppressed.

The measurement method of the average fiber diameter of the cellulose fiber before the polymerization reaction, used in the production method of the present invention, is as follows. First, if necessary, the freeze-dried cellulose fiber is observed with a field-emission scanning electron microscope (S-4000, manufactured by Hitachi Ltd.). From the electron microscope (SEM) image, the length of the cellulose fiber (monofilament) in the direction perpendicular to the lengthwise direction of the fiber is measured. In this case, the maximum value of the lengths of the perpendicular direction is taken as the fiber diameter. In the same manner, the fiber diameters of 10 cellulose fibers (monofilaments) are measured, and the average value over the 10 fiber diameters is derived to be taken as the average fiber diameter.

In the polyamide resin composition of the present invention, within the range not significantly impairing the properties of the polyamide resin composition, for example, the following additives may also be included: a pigment, a heat stabilizer, an antioxidant, an antiweathering agent, a plasticizer, a lubricant, a release agent, an antistatic agent, an anti-impact agent, a flame retardant and a compatibilizing agent.

In the polyamide resin composition of the present invention, within the range not significantly impairing the properties of the polyamide resin composition, polymers other than the polyamide resin may also be included. Examples of such other polymers include polyolefin, polyester, polycarbonate, polystyrene, polymethyl (meth)acrylate, poly(acrylonitrile-butadiene-styrene) copolymer, liquid crystal polymer and polyacetal.

The polyamide resin composition of the present invention can be molded into various types of molded articles by the molding methods such as injection molding, blow molding, extrusion molding and foam molding. Specifically, polyamide resin composition can be molded into the following molded articles: molded articles obtained by injection molding; films and sheets obtained by extrusion molding and molded articles obtained by processing these films and sheets; hollow bodies obtained by blow molding and molded articles obtained by processing these hollow bodies; and fibers obtained by melt spinning.

Specific examples of these molded articles include: resin components for electrical appliances such as enclosure components and enclosures of personal computers, enclosure components and enclosures of cellular phones, and enclosure components of other OA appliances, and connectors; resin components for automobiles such as bumpers, instrument panels, console boxes, garnishes, door trims, ceilings, floors and panels around engines; agricultural materials such as containers and growth vessels, and resin components for agricultural machines; resin components for fishing industry such as floats and vessels for fishery processed products; tableware such as dishes, cups spoons, and food vessels; resin components for medical care such as syringes and intravenous drip vessels; resin components for housing, civil engineering and construction such as drain materials, fences, chests and electrical switchboards for construction; resin components for plant and flower growing materials such as bricks for flowerbeds and flowerpots; resin components for leisure and miscellaneous goods such as cool boxes, fans and toys; resin components for stationery such as ballpoint pens, rules and clips; and articles obtained by knitting or weaving of fibers such as woven or knitted fabrics, and non-woven fabrics.

EXAMPLES

Hereinafter, the present invention is described more specifically with reference to Examples. The measurement methods of the values of the various properties in Examples are as follows.

(Flexural Modulus of Elasticity and Flexural Strength)
By using the obtained polyamide resin compositions (pellets), the titled values were measured by the aforementioned methods.

(Tensile Modulus of Elasticity and Tensile Yield Strength)
By using the obtained polyamide resin compositions (pellets), the titled values were measured by the aforementioned methods.

(Heat Deformation Temperature (HDT))
By using the obtained polyamide resin compositions (pellets), the titled value was measured by the aforementioned methods.

(Linear Expansion Coefficient)
By using the obtained polyamide resin compositions (pellets), the titled value was measured by the aforementioned methods.

(Average Fiber Diameter of Cellulose Fiber)
The average fiber diameter of the cellulose fiber in each of the obtained polyamide resins, and the fiber diameter of each of the cellulose fibers before the polymerization reaction, used for the polymerization reaction were measured and derived by the aforementioned method.

Example 1

As the aqueous dispersion of cellulose fiber, Celish KY100G (manufactured by Daicel FineChem Ltd.; including 10% by mass of cellulose fiber having an average fiber diameter of 125 nm) was used; purified water was added to the aqueous dispersion and the resulting mixture was stirred with a mixer to prepare an aqueous dispersion having a cellulose fiber content of 3% by mass.

With a mixer, 170 parts by mass of the aqueous dispersion of the cellulose fiber, 216 parts by mass ε-caprolactam, 44 parts by mass of aminocaproic acid and 0.56 part by mass of phosphorous acid were stirred and mixed until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were such that the cylinder temperature was set at 260° C. and the mold temperature was set at 80° C.

Example 2

In the same manner as in Example 1, an aqueous dispersion having a content of the cellulose fiber of 3% by mass was prepared, and 70 parts by mass of the aqueous dispersion of the cellulose fiber and 100 parts by mass of ε-caprolactam were further stirred and mixed with a mixer until a uniform dispersion was obtained. Successively, the resulting mixed dispersion was heated to 240° C. while the resulting mixed dispersion solution was being stirred, and the pressure was increased from 0 kgf/cm$^2$ to 7 kgf/cm$^2$ while the water vapor was gradually being discharged. Then, the pressure was released to atmospheric pressure, and the polymerization reaction was performed at 240° C. for 1 hour. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Example 3

In the same manner as in Example 1, an aqueous dispersion having a content of the cellulose fiber of 3% by mass was prepared, and 70 parts by mass of the aqueous dispersion of the cellulose fiber and 100 parts by mass of nylon 66 salt were stirred and mixed with a mixer until a uniform dispersion was obtained. Successively, the resulting mixed dispersion was heated while being stirred at 230° C. until the internal pressure reached 15 kgf/cm². After reaching this pressure; this pressure was maintained by continuing the heating while the water vapor was being gradually discharged. At the time where the temperature reached 280° C., the pressure was released to normal pressure, and the polymerization reaction was performed for further 1 hour. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were such that the cylinder temperature was set at 290° C. and the mold temperature was set at 80° C.

Example 4

In the same manner as in Example 1, an aqueous dispersion having a content of the cellulose fiber of 1.3% by mass was prepared. And, 210 parts by mass of the aqueous dispersion of the cellulose fiber, 140 parts by mass of aminoundecanoic acid and 0.14 part by mass of phosphorous acid were stirred and mixed with a mixer until a uniform dispersion was obtained. Successively, the resulting mixed dispersion was gradually heated to be increased in temperature to 200° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was used as it was for molding a specimen.

The injection molding conditions when the specimens to be used for the measurements of the flexural strength and others were obtained were such that the cylinder temperature was set at 210° C. and the mold temperature was set at 80° C.

Example 5

In the same manner as in Example 1, an aqueous dispersion having a content of the cellulose fiber of 3% by mass was prepared, and 70 parts by mass of the aqueous dispersion of the cellulose fiber and 100 parts by mass of 12-aminododecanoic acid were stirred and mixed with a mixer until a uniform dispersion was obtained. Successively, the resulting mixed dispersion was gradually heated to be increased in temperature to 200° C. while the water vapor was being discharged in the course of the heating, and then the mixed dispersion was stirred at 230° C. for 1 hour to perform a polymerization reaction. At the time of completion of the polymerization, the obtained resin composition was taken out and cut into pellets. The obtained pellet was used as it was for molding a specimen.

The injection molding conditions when the specimens to be used for the measurements of the flexural strength and others were obtained were such that the cylinder temperature was set at 210° C. and the mold temperature was set at 80° C.

Example 6

As the aqueous dispersion of cellulose fiber, Celish KY100S (manufactured by Daicel FineChem Ltd.; including 25% by mass of cellulose fiber having an average fiber diameter of 140 nm) was used. And, 98 parts by mass of the aqueous dispersion of the cellulose fiber, 216 parts by mass of ε-caprolactam, 44 parts by mass of aminocaproic acid, 0.59 part by mass of phosphorous acid and 157 parts by mass of purified water were stirred and mixed with a mixer until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Example 7

As the aqueous dispersion of cellulose fiber, Celish KY100S (manufactured by Daicel FineChem Ltd.; including 25% by mass of a cellulose fiber having an average fiber diameter of 140 nm) was used. And, 160 parts by mass of the aqueous dispersion of the cellulose fiber, 170 parts by mass of ε-caprolactam, 30 parts by mass of aminocaproic acid, 0.35 part by mass of phosphorous acid and 150 parts by mass of purified water were stirred and mixed with a mixer until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Production Example 1

Production of Bacterial Cellulose

Into a 200-ml volume Erlenmeyer flask, 50 ml of a culture medium having a composition including 0.5% by mass of glucose, 0.5% by mass of polypeptone, 0.5% by mass of yeast extract and 0.1% by mass of magnesium sulfate heptahydrate was dispensed, and was sterilized by steam at 120° C. for 20 minutes in an autoclave. To this culture medium, a platinum loop of Glucon *acetobacter xylinus* (NBRC 16670) grown in a test tube slant agar medium was inoculated, and the resulting culture was subjected to a static incubation at 30° C. for 7 days. After 7 days, a white gel film-like bacterial cellulose was produced in the upper layer of the culture.

Example 8

As cellulose fiber, the bacterial cellulose obtained in the production example 1 was used. The bacterial cellulose was crushed with a mixer, then repeatedly immersed in water and washed with water, and thus substitution with water was performed. By using a mixer, 31 parts by mass of an aqueous dispersion (including 4.1% by mass of a bacterial cellulose having an average fiber diameter of 60 nm) of the bacterial cellulose after substitution with water, 216 parts by mass of ε-caprolactam, 44 parts by mass of aminocaproic acid, 0.5 part by mass of phosphorous acid and 50 parts by mass of purified water were stirred and mixed until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Example 9

By using a mixer, 35 parts by mass of an aqueous dispersion (including 63% by mass of a bacterial cellulose having an average fiber diameter of 60 nm) of the bacterial cellulose after substitution with water, obtained in the same manner as in Example 8, 194 parts by mass of ε-caprolactam, 40 parts by mass of aminocaproic acid, 0.5 part by mass of phosphorous acid and 90 parts by mass of purified water were stirred and mixed until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

By using a freeze ultramicrotome, from the obtained specimen, a 100-nm thick section was sampled and dyed with $OsO_4$, and then the section was observed with a transmission electron microscope (JEM-1230, manufactured by JEOL Ltd.). The cross-section of the resin composition was photographed, and the taken electron microgram is shown in FIG. 1.

Example 10

By using a mixer, 71 parts by mass of an aqueous dispersion (including 4.1% by mass of a bacterial cellulose having an average fiber diameter of 60 nm) of the bacterial cellulose after substitution with water, obtained in the same manner as in Example 8, 162 parts by mass of ε-caprolactam, 33 parts by mass of aminocaproic acid, 0.38 part by mass of phosphorous acid and 20 parts by mass of purified water were stirred and mixed until a uniform dispersion was obtained. Successively, the resulting mixed dispersion solution was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Example 11

Purified water was added to the cellulose fiber aggregate obtained as waste threads in a production process of a nonwoven fabric, and the resulting mixture was stirred with a mixer to prepare an aqueous dispersion including 3% by mass of cellulose fibers having an average fiber diameter of 120 nm.

By using a mixer, 170 parts by mass of the resulting aqueous dispersion of the cellulose fiber, 216 parts by mass of ε-caprolactam, 44 parts by mass of aminocaproic acid and 0.59 part by mass of phosphorous acid were stirred and mixed until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Example 12

The same aqueous dispersion including 3% by mass of the cellulose fiber as in Example 11 was used. By using a mixer, 85 parts by mass of the aqueous dispersion of the cellulose fiber, 216 parts by mass of ε-caprolactam, 44 parts by mass of aminocaproic acid and 0.59 part by mass of phosphorous acid were stirred and mixed until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Production Example 2

Production of Fine Cellulose

In 100 ml of water containing 0.025 g of 2,2,6,6-tetramethyl-1-piperidine-N-oxyl (TEMPO) and 0.25 g of sodium bromide as dissolved therein, 2 g of cellulose (qualitative filer paper No. 1) was dispersed. Then, a 13% by weight aqueous solution of sodium hypochlorite was added to the resulting dispersion in such a way that the amount of sodium hypochlorite in relation to 1 g of pulp was 4.3 mmol. By using a pH stat, an aqueous solution of sodium hydroxide was added to the dispersion in such a way that the pH of the dispersion was 10.5, and the reaction was terminated at the time point when the pH showed no change. The contents of the reaction vessel used were washed with water four times by a centrifugal separation method, and then defibrated for 30 minutes with a household mixer. The average fiber diameter of the obtained cellulose fiber was 110 nm.

Example 13

An aqueous dispersion including 1.6% by mass of the cellulose fiber obtained in Production Example 2 was used. By using a mixer, 95 parts by mass of the aqueous dispersion of the cellulose fiber, 131 parts by mass of ε-caprolactam, 26 parts by mass of aminocaproic acid and 0.3 part by mass of phosphorous acid were stirred and mixed until a uniform dispersion was obtained. Successively, the resulting mixed dispersion was gradually heated to be increased in temperature to 240° C. while the water vapor was being discharged in the course of the heating, and then the mixed dispersion was stirred at 240° C. for 1 hour to perform a polymerization reaction. At the time of completion of the polymerization, the obtained resin composition was taken out and cut into pellets. The obtained pellet was treated with hot water at 95° C., refined and dried.

The injection molding conditions when the specimens to be used for the measurements of the flexural strength and others were obtained were the same as in Example 1.

Example 14

Purified water was added to the cellulose fiber aggregate obtained as waste threads in a production process of a non-woven fabric, and the resulting mixture was stirred with a mixer to prepare an aqueous dispersion including 6% by mass of cellulose fiber having an average fiber diameter of 3240 nm.

A pellet was obtained by performing the polymerization reaction in the same manner as in Example 11 except that the aqueous dispersion of the cellulose fiber was used.

The injection molding conditions when the specimens to be used for the measurements of the flexural strength and others were obtained were the same as in Example 1.

Example 15

A pellet was obtained by performing the polymerization reaction in the same manner as in Example 3 except that the same aqueous dispersion including 6% by mass of the cellulose fiber as in Example 14 was used.

The injection molding conditions when the specimens to be used for the measurements of the flexural strength and others were obtained were the same as in Example 3.

Example 16

Purified water was added to the cellulose fiber aggregate obtained as the waste threads in a production process of a non-woven fabric, and the resulting mixture was stirred with a mixer to prepare an aqueous dispersion including 2.6% by mass of cellulose fibers having an average fiber diameter of 3240 nm.

A pellet was obtained by performing the polymerization reaction in the same manner as in Example 4 except that the aqueous dispersion of the cellulose fiber was used.

The injection molding conditions when the specimens to be used for the measurements of the flexural strength and others were obtained were the same as in Example 4.

Example 17

A pellet was obtained by performing the polymerization reaction in the same manner as in Example 5 except that the same aqueous dispersion including 6% by mass of the cellulose fiber as in Example 14 was used.

The injection molding conditions when the specimens to be used for the measurements of the flexural strength and others were obtained were the same as in Example 5.

Comparative Example 1

A polyamide resin composition was obtained in the same manner as in Example 1 except that the aqueous dispersion of the cellulose fiber was not added.

The injection molding conditions when the specimens to be used for the measurements of the flexural strength and others were obtained were the same as in Example 1.

Comparative Example 2

A polyamide resin composition was obtained in the same manner as in Example 3 except that the aqueous dispersion of the cellulose fiber was not added.

The injection molding conditions when the specimens to be used for the measurements of the flexural strength and others were obtained were the same as in Example 3.

Comparative Example 3

A polyamide resin composition was obtained in the same manner as in Example 4 except that the aqueous dispersion of the cellulose fiber was not added.

The injection molding conditions when the specimens to be used for the measurements of the flexural strength and others were obtained were the same as in Example 4.

Comparative Example 4

A polyamide resin composition was obtained in the same manner as in Example 5 except that the aqueous dispersion of the cellulose fiber was not added.

The injection molding conditions when the specimens to be used for the measurements of the flexural strength and others were obtained were the same as in Example 5.

Comparative Example 5

A polyamide resin composition was obtained in the same manner as in Example 1 except that cotton staple fiber (average fiber diameter: 16 μm) was used as the cellulose fiber.

The injection molding conditions when the specimens to be used for the measurements of the flexural strength and others were obtained were the same as in Example 1.

Comparative Example 6

A polyamide resin composition was obtained in the same manner as in Example 3 except that the same cotton staple fiber (average fiber diameter: 16 μm) as in Comparative Example 5 was used as the cellulose fiber.

The injection molding conditions when the specimens to be used for the measurements of the flexural strength and others were obtained were the same as in Example 3.

Comparative Example 7

A polyamide resin composition was obtained in the same manner as in Example 4 except that the same cotton staple fiber (average fiber diameter: 16 μm) as in Comparative Example 5 was used as the cellulose fiber.

The injection molding conditions when the specimens to be used for the measurements of the flexural strength and others were obtained were the same as in Example 4.

Comparative Example 8

A polyamide resin composition was obtained in the same manner as in Example 5 except that the same cotton staple fiber (average fiber diameter: 16 μm) as in Comparative Example 5 was used as the cellulose fiber.

The injection molding conditions when the specimens to be used for the measurements of the flexural strength and others were obtained were the same as in Example 5.

Comparative Example 9

The polymerization reaction was attempted in the same manner as in Example 6 except that the amount of the aqueous dispersion of the cellulose fiber was altered to 588 parts by mass; however, the reaction mixture was not able to be stirred, and polymerization was difficult.

Comparative Example 10

Celish KY100G (manufactured by Daicel FineChem Ltd.; including 10% by mass of a cellulose fiber having an average fiber diameter of 125 nm) was freeze dried, and then crushed into a powdery cellulose; the resulting powdery cellulose was used as the cellulose fiber.

With 100 parts by mass of nylon 6 (BRL, manufactured by Unitika Ltd., number average molecular weight: 17000), 2 parts by mass of the obtained powdery cellulose was blended, and the resulting mixture was fed to a twin screw extruder (PCM-30, manufactured by Ikegai Corp.) having a screw diameter of 30 mm and an average groove depth of 2.5 mm, and melt-kneaded at a barrel temperature of 240° C., at a number of screw rotations of 120 rpm and with a residence time of 2.7 minutes. The resin composition obtained by the melt-kneading was taken out and cut into pellets. The obtained pellets were directly molded and measurements of various physical properties were made with the thus prepared molded articles. The injection molding conditions when the specimens to be used for the measurements of the flexural strength and others were obtained were the same as in Example 1.

In the same manner as in Example 9, the cross-section of the resin composition obtained in Comparative Example 10 was photographed, and the taken electron micrograph is shown in FIG. 2. In this case, in the specimen obtained in Comparative Example 10, aggregates of a few millimeters in size were visually found here and there. FIG. 2 shows an electron micrograph obtained by photographing the cross-section of a portion in which no such aggregates were visually identified.

Comparative Example 11

A resin composition was obtained by melt-kneading and the resin composition was converted into pellets in the same manner as in Comparative Example 10 except that nylon 66 (Maranyl A125, manufactured by Unitika Ltd., number average molecular weight: 18000) was used in place of nylon 6.

The injection molding conditions when the specimens to be used for the measurements of the flexural strength and others were obtained were such that the cylinder temperature was set at 270° C. and the mold temperature was set at 80° C.

Comparative Example 12

A resin composition was obtained by melt-kneading and the resin composition was converted into pellets in the same manner as in Comparative Example 10 except that nylon 11 (Rilsan BMN, manufactured by Arkema Inc., number average molecular weight: 15000) was used in place of nylon 6.

The injection molding conditions when the specimens to be used for the measurements of the flexural strength and others were obtained were such that the cylinder temperature was set at 210° C. and the mold temperature was set at 80° C.

Comparative Example 13

A resin composition was obtained by melt-kneading and the resin composition was converted into pellets in the same manner as in Comparative Example 10 except that nylon 12 (Rilsan AMN, manufactured by Arkema Inc., number average molecular weight: 15000) was used in place of nylon 6.

The injection molding conditions when the specimens to be used for the measurements of the flexural strength and others were obtained were such that the cylinder temperature was set at 200° C. and the mold temperature was set at 80° C.

Table 1 shows the measurement results of the values of the properties of the polyamide resin compositions obtained in Examples 1 to 17 and Comparative Examples 1 to 13.

TABLE 1

| | | Composition | | | Values of properties | | |
| --- | --- | --- | --- | --- | --- | --- | --- |
| | | | Cellulose fiber | | Heat deformation temperature (° C.) | | Linear expansion |
| | Polyamide resin | Type | Average fiber diameter[*1] (nm) | Content[*2] (parts by mass) | Load 1.8 MPa | Load 0.45 MPa | coefficient[*3] (×10$^{-6}$, (1/° C.)) MD direction |
| Examples 1 | Nylon 6 | KY100G | 55 | 2.0 | 88 | 204 | 50 |
| 2 | Nylon 6 | KY100G | 51 | 2.0 | 76 | 193 | 56 |
| 3 | Nylon 66 | KY100G | 48 | 2.0 | 83 | 190 | 75 |
| 4 | Nylon 11 | KY100G | 75 | 2.0 | 58 | 162 | 110 |

TABLE 1-continued

| | | | | | | | |
|---|---|---|---|---|---|---|---|
| 5 | Nylon 12 | KY100G | 63 | 2.0 | 68 | 150 | 107 |
| 6 | Nylon 6 | KY100S | 88 | 10.0 | 131 | 202 | 25 |
| 7 | Nylon 6 | KY100S | 105 | 20.0 | 150 | 205 | 20 |
| 8 | Nylon 6 | Bacterial cellulose | 38 | 0.5 | 90 | 206 | 38 |
| 9 | Nylon 6 | Bacterial cellulose | 40 | 1.0 | 165 | 209 | 30 |
| 10 | Nylon 6 | Bacterial cellulose | 45 | 1.5 | 178 | 212 | 24 |
| 11 | Nylon 6 | Waste thread | 45 | 2.0 | 74 | 200 | 52 |
| 12 | Nylon 6 | Waste thread | 43 | 1.0 | 68 | 200 | 60 |
| 13 | Nylon 6 | Fine cellulose | 10 | 1.0 | 73 | 204 | 52 |
| 14 | Nylon 6 | Waste thread | 1250 | 4.0 | 70 | 187 | 60 |
| 15 | Nylon 66 | Waste thread | 1110 | 4.0 | 80 | 183 | 80 |
| 16 | Nylon 11 | Waste thread | 1410 | 4.0 | 56 | 156 | 120 |
| 17 | Nylon 12 | Waste thread | 1350 | 4.0 | 60 | 148 | 117 |

| | | Values of properties | | | | |
|---|---|---|---|---|---|---|
| | | Linear expansion coefficient*[3] ($\times 10^{-6}$, (1/° C.)) TD direction | Flexural strength (MPa) | Flexural modulus of elasticity (GPa) | Tensile yield strength (MPa) | Tensile modulus of elasticity (GPa) | Number average molecular weight (relative to PMMA) |
| Examples | 1 | 110 | 156 | 4.0 | 80 | 2.3 | 18700 |
| | 2 | 112 | 148 | 3.5 | 81 | 2.4 | 19300 |
| | 3 | 150 | 150 | 3.4 | 78 | 2.1 | 18300 |
| | 4 | 180 | 73 | 2.0 | 42 | 1.4 | 15000 |
| | 5 | 165 | 75 | 1.9 | 45 | 1.4 | 16000 |
| | 6 | 103 | 158 | 4.9 | 95 | 2.8 | 16200 |
| | 7 | 101 | 162 | 5.6 | 102 | 2.9 | 18000 |
| | 8 | 79 | 128 | 3.2 | 83 | 2.5 | 18000 |
| | 9 | 97 | 156 | 4.1 | 94 | 2.8 | 16900 |
| | 10 | 98 | 144 | 4.3 | 107 | 3.0 | 15900 |
| | 11 | 94 | 143 | 3.6 | 82 | 2.4 | 18400 |
| | 12 | 98 | 133 | 3.3 | 78 | 2.3 | 16000 |
| | 13 | 90 | 133 | 3.2 | 78 | 2.2 | 20000 |
| | 14 | 115 | 140 | 3.3 | 79 | 2.2 | 17700 |
| | 15 | 160 | 142 | 3.3 | 75 | 2.1 | 17500 |
| | 16 | 182 | 72 | 1.8 | 45 | 1.5 | 14300 |
| | 17 | 168 | 68 | 1.8 | 43 | 1.4 | 14800 |

| | | Composition | | | Values of properties | | |
|---|---|---|---|---|---|---|---|
| | | | Cellulose fiber | | Heat deformation temperature (° C.) | | Linear expansion coefficient*[3] ($\times 10^{-6}$, (1/° C.) MD direction |
| | | Polyamide resin | Type | Average fiber diameter*[1] (nm) | Content*[2] (parts by mass) | Load 1.8 MPa | Load 0.45 MPa | |
| Comparative Examples | 1 | Nylon 6 | — | — | — | 58 | 181 | 80 |
| | 2 | Nylon 66 | — | — | — | 70 | 175 | 95 |
| | 3 | Nylon 11 | — | — | — | 47 | 142 | 150 |
| | 4 | Nylon 12 | — | — | — | 48 | 142 | 132 |
| | 5 | Nylon 6 | Cotton staple fiber | 13.8 μm | 2.0 | 58 | 175 | 79 |
| | 6 | Nylon 66 | Cotton staple fiber | 14.2 μm | 2.0 | 72 | 180 | 90 |
| | 7 | Nylon 11 | Cotton staple fiber | 28.5 μm | 2.0 | 52 | 160 | 140 |
| | 8 | Nylon 12 | Cotton staple fiber | 20.1 μm | 2.0 | 47 | 146 | 130 |
| | 9 | Nylon 6 | KY100S | No measurement was possible. | 60 | Stirring was impossible, and polymerization was difficult. | | |
| | 10 | Nylon 6 | KY100G | 2.7 μm | 2.0 | 61 | 185 | 82 |
| | 11 | Nylon 66 | KY100G | 9.5 μm | 2.0 | 70 | 177 | 92 |
| | 12 | Nylon 11 | KY100G | 21.4 μm | 2.0 | 48 | 145 | 147 |
| | 13 | Nylon 12 | KY100G | 17.5 μm | 2.0 | 52 | 145 | 122 |

| | | Values of properties | | | | |
|---|---|---|---|---|---|---|
| | | Linear expansion coefficient*[3] ($\times 10^{-6}$, (1/° C.) TD direction | Flexural strength (MPa) | Flexural modulus of elasticity (GPa) | Tensile yield strength (MPa) | Tensile modulus of elasticity (GPa) | Number average molecular weight (relative to PMMA) |
| Comparative Examples | 1 | 118 | 129 | 3.0 | 76 | 2.1 | 20100 |
| | 2 | 165 | 120 | 3.1 | 80 | 2.8 | 18300 |
| | 3 | 182 | 68 | 1.6 | 40 | 1.2 | 20000 |
| | 4 | 175 | 60 | 1.5 | 39 | 1.3 | 21800 |

TABLE 1-continued

| | | | | | | |
|---|---|---|---|---|---|---|
| 5 | 117 | 135 | 3.1 | 65 | 2.0 | 18000 |
| 6 | 167 | 122 | 3.1 | 81 | 2.6 | 19000 |
| 7 | 190 | 70 | 1.8 | 42 | 1.0 | 19000 |
| 8 | 171 | 61 | 1.5 | 41 | 1.1 | 21500 |
| 9 | | | Stirring was impossible, and polymerization was difficult. | | | |
| 10 | 118 | 129 | 3.2 | 63 | 2.0 | 17500 |
| 11 | 160 | 115 | 3.2 | 68 | 3.0 | 17200 |
| 12 | 185 | 71 | 1.7 | 39 | 1.0 | 14000 |
| 13 | 170 | 65 | 1.5 | 41 | 1.2 | 14700 |

*[1]In each of Comparative Examples 10 to 13, for the sample in which cellulose fiber was aggregated in the resin composition, the average fiber diameter was measured by assuming the cellulose fiber aggregates as cellulose fiber monofilaments.
*[2]The content of cellulose fiber in relation to 100 parts by mass of polyamide resin.
*[3]Over-all average for 20 to 150° C., in 1st scan with increasing temperature.

As can be seen from Table 1, the polyamide resin compositions obtained in Examples 1 to 17 were each a polyamide resin composition obtained by mixing an aqueous dispersion of cellulose fiber having a fiber diameter of 10 μm or less and the monomer constituting the polyamide resin and by subjecting the resulting mixture to polymerization reaction, and hence are each a polyamide resin composition in which fine cellulose fibers were uniformly dispersed in the polyamide resin without being aggregated. Such a dispersion condition is obvious also from FIG. 1. Specifically, FIG. 1 is an electron micrograph obtained by photographing the cross-section of the polyamide resin composition obtained in Example 9, and the cellulose fibers are dispersed without being mutually aggregated as shown in the region surrounded by an ellipse.

Consequently, the polyamide resin compositions obtained in Examples 1 to 17 were each high in flexural modulus of elasticity, tensile modulus of elasticity, flexural strength and tensile yield strength, and further each were low in the linear expansion coefficient in the MD direction and excellent in mechanical properties. Further, the polyamide resin compositions obtained in Examples 1 to 17 were each high in heat deformation temperature and excellent in heat resistance.

On the other hand, the polyamide resin compositions obtained in Comparative Examples 1 to 4 each did not include cellulose fiber, and hence, were lower in any of flexural modulus of elasticity, flexural strength, tensile modulus of elasticity, tensile yield strength and heat deformation temperature, each exhibited a higher value for the linear expansion coefficient, and were poorer both in mechanical properties and in heat resistance, as compared to the polyamide resin compositions of Examples 1 to 5. The polyamide resin compositions obtained in Comparative Examples 5 to 8 were each prepared by performing the polymerization reaction by using cellulose fiber having a fiber diameter exceeding 10 μm, the obtained polyamide resin compositions were each a composition including cellulose fiber having an average fiber diameter exceeding 10 μm, and hence were each lower in any of flexural modulus of elasticity, flexural strength, tensile modulus of elasticity, tensile yield strength and heat deformation temperature, each exhibited a higher value for the linear expansion coefficient, and each were poorer both in mechanical properties and in heat resistance, as compared to the polyamide resin compositions of Examples 1 to 5. In Comparative Example 9, the content of the cellulose fiber was too large, hence the stirring was difficult at the time of the polymerization reaction, and no resin composition was able to be obtained. The polyamide resin compositions obtained in Comparative Examples 10 to 13 each were obtained by a melt-kneading method, different from the production method of the present invention, and hence the dispersibility of the cellulose fiber was unsatisfactory in the melt-kneading step to cause the aggregation of the cellulose fiber. In this condition, even in the portion where visually no aggregate was identified, the aggregation of the cellulose fiber occurred in the resin composition; for example, in the electron micrograph of FIG. 2 obtained by photographing the cross-section of the resin composition obtained in Comparative Example 10, the aggregate of the cellulose fiber is shown as a large white area extending from the center of the micrograph toward the left side. Consequently, the polyamide resin compositions obtained in Comparative Examples 10 to 13 became the polyamide resin compositions including cellulose fibers having a large fiber diameter, and hence each were lower in any of flexural modulus of elasticity, flexural strength, tensile modulus of elasticity, tensile yield strength and heat deformation temperature, each exhibited a higher value for the linear expansion coefficient, and each were poorer both in mechanical properties and in heat resistance, as compared to the resin compositions obtained in Examples 1 to 5 (as compared to the resin compositions each including the cellulose fiber in the same amount).

The invention claimed is:

1. A polyamide resin composition comprising 0.01 to 10 parts by mass of cellulose fiber having an average fiber diameter of 500 nm or less in relation to 100 parts by mass of a polyamide resin, wherein a flexural modulus of elasticity thereof is 1.8 GPa or more, and a heat deformation temperature thereof under a load of 1.8 MPa is 55° C. or higher.

2. The polyamide resin composition according to claim 1, obtained by mixing a monomer constituting the polyamide resin and an aqueous dispersion of the cellulose fiber having the average fiber diameter of 500 nm or less and by subjecting a resulting mixture to a polymerization reaction.

3. The polyamide resin composition according to claim 1, wherein a linear expansion coefficient (derived as an average value in a range from 20 to 150° C.) thereof in an MD direction is $120 \times 10^{-6}$ (1/° C.) or less.

4. The polyamide resin composition according to claim 1, wherein the heat deformation temperature thereof under the load of 1.8 MPa is 50° C. or higher, and the linear expansion coefficient (derived as the average value in the range from 20 to 150° C.) thereof in the MD direction is $120 \times 10^{-6}$ (1/° C.) or less.

5. The polyamide resin composition according to claim 1, wherein the heat deformation temperature thereof under the load of 1.8 MPa is 65° C. or higher.

6. The polyamide resin composition according to claim 1, wherein the linear expansion coefficient (derived as the average value in the range from 20 to 150° C.) thereof in the MD direction is $80 \times 10^{-6}$ (1/° C.) or less.

7. The polyamide resin composition according to claim 1, wherein the heat deformation temperature thereof under the load of 1.8 MPa is 65° C. or higher, and the linear expansion coefficient (derived as the average value in the range from 20 to 150° C.) thereof in the MD direction is $80 \times 10^{-6}$ (1/° C.) or less.

8. The polyamide resin composition according to claim 1, wherein the polyamide resin is nylon 11 or nylon 12.

9. The polyamide resin composition according to claim 1, wherein the polyamide resin is nylon 6 or nylon 66.

10. A method for producing the polyamide resin composition according to claim 1, wherein a monomer constituting the polyamide resin and the aqueous dispersion of the cellulose fiber having the average fiber diameter of 500 nm or less are mixed and the resulting mixture is subjected to the polymerization reaction.

* * * * *